United States Patent
Williamson et al.

(10) Patent No.: US 7,823,957 B2
(45) Date of Patent: Nov. 2, 2010

(54) CLAMP MECHANISM FOR A COVER ASSEMBLY

(75) Inventors: Scott A. Williamson, Orlando, FL (US);
Michael Williamson, Corunna, MI (US); Louis Laszlo Simko, Flushing, MI (US)

(73) Assignee: Rugged Liner, Owosso, MI (US)

( * ) Notice: Subject to any disclaimer, the term of this patent is extended or adjusted under 35 U.S.C. 154(b) by 0 days.

(21) Appl. No.: 12/468,344

(22) Filed: May 19, 2009

(65) Prior Publication Data
US 2010/0038926 A1 Feb. 18, 2010

Related U.S. Application Data

(60) Provisional application No. 61/188,982, filed on Aug. 14, 2008.

(51) Int. Cl.
*B60P 7/02* (2006.01)
(52) U.S. Cl. ............ 296/100.16; 292/256; 292/DIG. 49
(58) Field of Classification Search ............ 296/100.16, 296/100.18, 100.03; 292/240, 256, 259 R, 292/DIG. 49
See application file for complete search history.

(56) References Cited

U.S. PATENT DOCUMENTS

| 309,767 | A | * | 12/1884 | Clarke | 292/165 |
|---|---|---|---|---|---|
| 4,639,033 | A | | 1/1987 | Wheatley et al. | |
| 4,832,395 | A | | 5/1989 | Lovaas | |
| 5,058,652 | A | | 10/1991 | Wheatley et al. | |
| 5,121,960 | A | | 6/1992 | Wheatley | |
| 5,190,341 | A | * | 3/1993 | Simard | 296/100.1 |
| 5,251,951 | A | | 10/1993 | Wheatley | |
| 5,255,946 | A | * | 10/1993 | Allerding et al. | 292/259 R |
| 5,275,458 | A | | 1/1994 | Barben et al. | |
| 5,301,913 | A | | 4/1994 | Wheatley | |
| 5,310,238 | A | | 5/1994 | Wheatley | |
| 5,385,377 | A | | 1/1995 | Girard | |
| 5,460,423 | A | | 10/1995 | Kersting et al. | |
| 5,487,585 | A | | 1/1996 | Wheatley | |
| 5,540,475 | A | | 7/1996 | Kersting et al. | |
| 5,636,893 | A | | 6/1997 | Wheatley et al. | |
| 5,655,808 | A | | 8/1997 | Wheatley | |
| 5,857,729 | A | | 1/1999 | Bogard | |

(Continued)

OTHER PUBLICATIONS

Collar definition : webster's Ninth New Collegiate dictionary 1986, p. 259.*

*Primary Examiner*—Glenn Dayoan
*Assistant Examiner*—Pinel E Romain
(74) *Attorney, Agent, or Firm*—Howard & Howard Attorneys PLLC

(57) ABSTRACT

A protective cover assembly for covering a space defined by at least one wall. The protective cover assembly includes a plurality of rails coupled to one another to form a frame for securing a material over the space. At least one support bow spans the space to support the material. Clamp mechanisms are coupled to the ends of the support bow for securing the protective cover assembly over the space. The clamp mechanisms include a latch member for engaging the wall and a handle for biasing the latch member against the wall. The clamp further includes a link for interconnecting the support bow to the frame. A collar is coupled to the link for guiding the handle and the latch member between an operational position and a stowed position along the link.

30 Claims, 15 Drawing Sheets

U.S. PATENT DOCUMENTS

| | | |
|---|---|---|
| 5,873,688 A | 2/1999 | Wheatley |
| 5,975,618 A | 11/1999 | Rippberger |
| 6,024,401 A | 2/2000 | Wheatley et al. |
| 6,024,402 A | 2/2000 | Wheatley |
| 6,053,558 A | 4/2000 | Weldy et al. |
| 6,149,220 A | 11/2000 | Weldy et al. |
| 6,227,602 B1 | 5/2001 | Bogard |
| 6,264,266 B1 | 7/2001 | Rusu et al. |
| 6,273,491 B1 | 8/2001 | Bath et al. |
| 6,340,194 B1 | 1/2002 | Muirhead et al. |
| 6,499,791 B2 | 12/2002 | Wheatley |
| 6,543,836 B1 | 4/2003 | Wheatley |
| 6,568,740 B1 | 5/2003 | Dimmer |
| 6,575,520 B1 | 6/2003 | Spencer |
| 6,811,203 B2 | 11/2004 | Wheatley |
| 6,814,389 B2 | 11/2004 | Wheatley |
| 6,824,191 B2 | 11/2004 | Wheatley |
| 6,893,073 B2 | 5/2005 | Wheatley |
| 6,976,724 B2 | 12/2005 | Wheatley |
| 7,025,403 B2 | 4/2006 | Wheatley |
| 7,188,888 B2 | 3/2007 | Wheatley et al. |
| 7,204,540 B2 | 4/2007 | Wheatley |
| 7,258,387 B2 | 8/2007 | Weldy |
| 7,322,633 B2 | 1/2008 | Zajicek et al. |
| 7,334,830 B2 | 2/2008 | Weldy |
| 7,384,090 B1 | 6/2008 | Weldy |
| 7,427,095 B2 | 9/2008 | Wheatley |
| 7,445,264 B2 | 11/2008 | Spencer et al. |
| 7,484,790 B2 | 2/2009 | Wheatley |
| 7,537,264 B2 | 5/2009 | Maimin et al. |
| 7,604,282 B2 | 10/2009 | Spencer et al. |
| 7,607,714 B2 | 10/2009 | Wheatley |
| 2008/0129077 A1 | 6/2008 | Weldy |

* cited by examiner

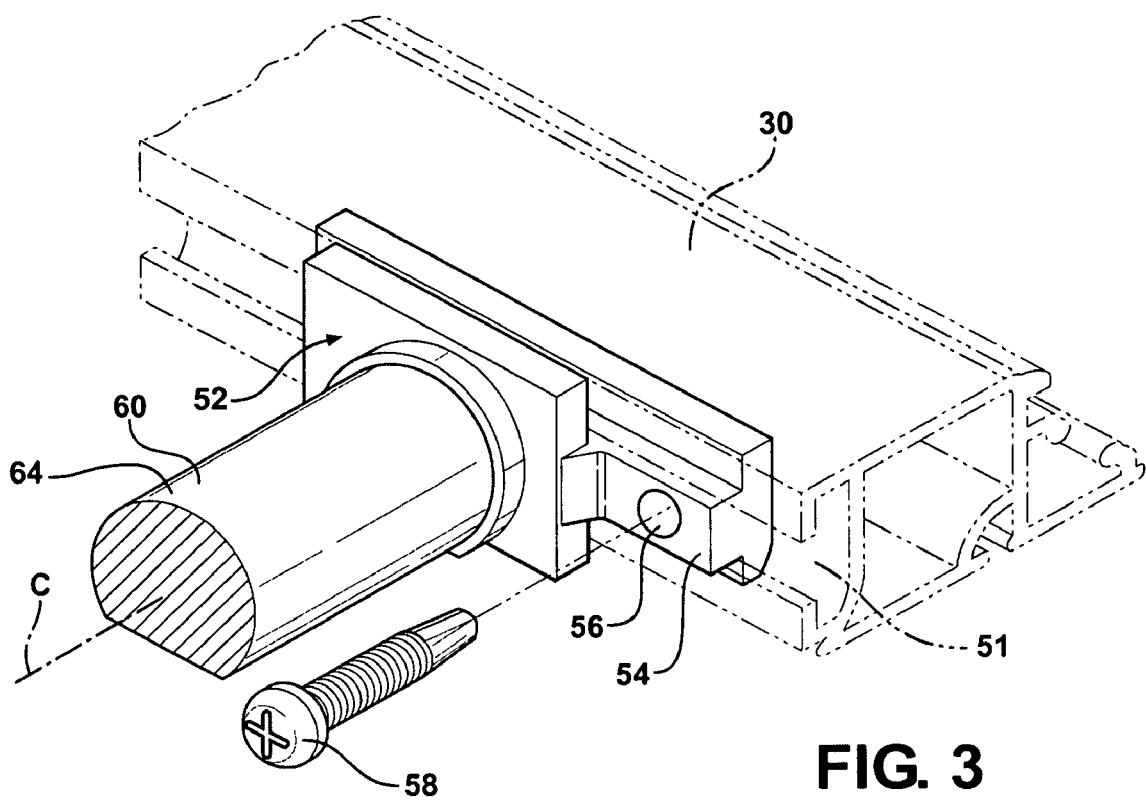
FIG. 3
FIG. 4A
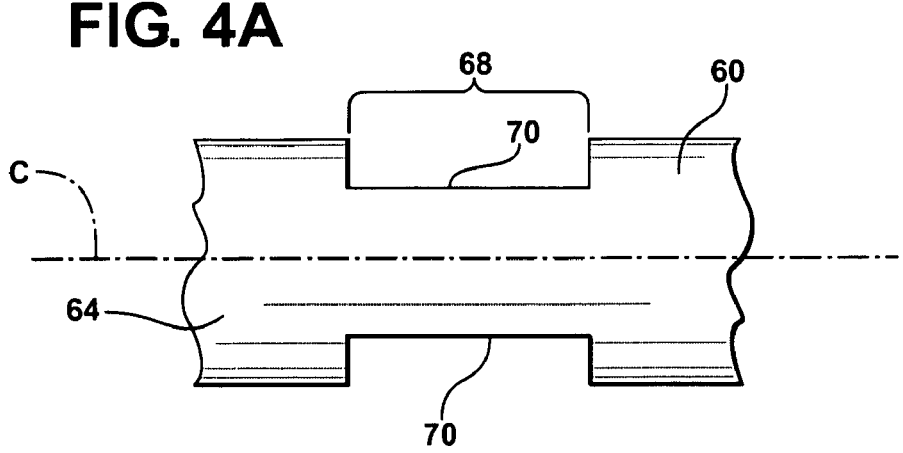

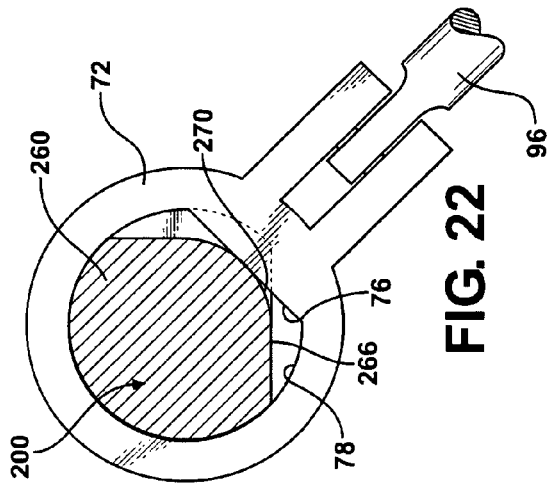
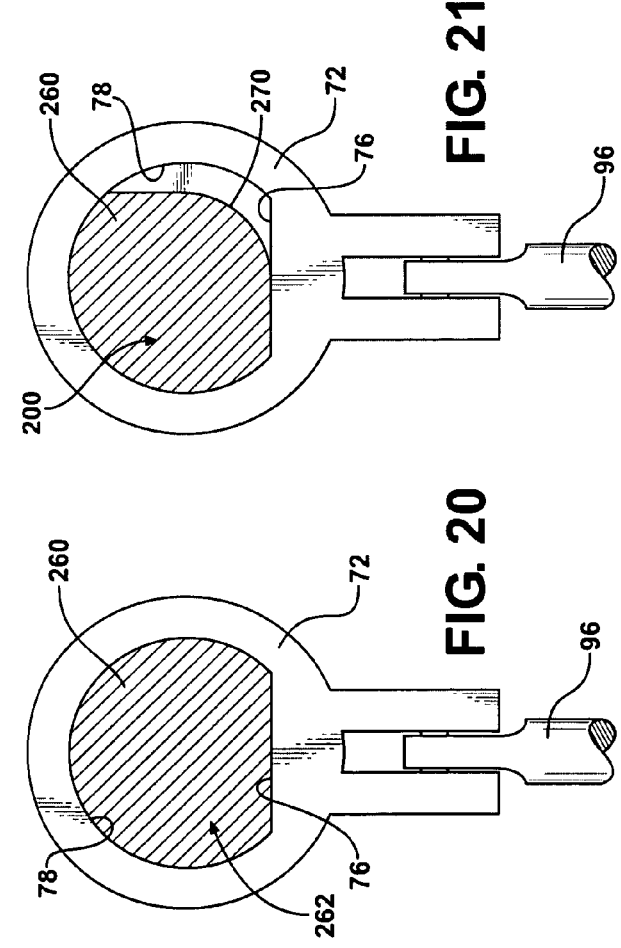
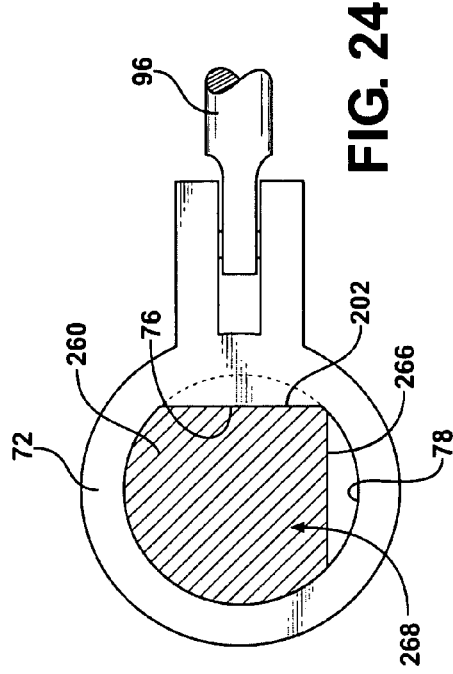
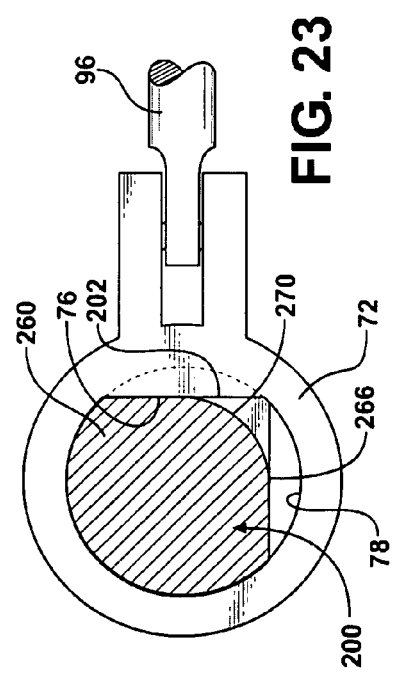
FIG. 20   FIG. 21   FIG. 22   FIG. 23   FIG. 24

CLAMP MECHANISM FOR A COVER ASSEMBLY

RELATED APPLICATION

This application claims the benefit of U.S. Provisional Patent Application No. 61/188,982, filed on Aug. 14, 2008, which is hereby incorporated by reference in its entirety.

FIELD OF THE INVENTION

The present invention generally relates to a protective cover assembly for covering a space, and more specifically, to clamp systems for securing the protective cover assembly over the space.

BACKGROUND

Protective cover assemblies comprising a frame and a material covering the frame are well known for protecting spaces such as boats, wagons, trailers, as well as the cargo area of a pick-up truck. The frame typically includes a plurality of rails disposed about the perimeter of the space and at least one support bow spanning the space between the rails for supporting the material.

To secure the frame over the space various systems have been employed over the years. In the past the protective cover was attached directly to the walls defining the space. Although effective, this method is not preferred due to the fact that a plurality of holes needed to be drilled into the walls defining the space. The holes cause permanent disfigurement to the appearance of the walls defining the space. Additionally, the holes invite an opportunity for corrosion thus causing further deterioration to the appearance and functionality of the walls.

In recent years, various clamp systems have been employed to secure the protective cover of the space. The clamp systems eliminate the need to permanently alter the integrity of the walls defining the space and allow the protective cover to be more easily removed. Examples of clamp systems can be found in U.S. Pat. No. 7,334,830 to Ross Weldy and U.S. Pat. No. 7,188,888 to Donald Wheatley and David Daley.

The '830 patent discloses a clamp system having a handle for moving the clamp system between an operational position and a stored position. A latch member is disposed adjacent the handle which defines a cammed profile for biasing the latch member against the wall defining the space. A track is defined by the support bow for guiding the clamp system. A bolt comprising a head and a shank couples the handle and latch member to the track. The head of the bolt rides within the track between the operational and stored positions. The support bow additionally defines a slot substantially perpendicular to the track for accepting and securing the shank of the bolt and holding the clamp mechanism in the stored position. When in the stored position the clamp system is held cantilevered, substantially perpendicular to the track. Over time the slot can become worn or even crack thereby losing the holding force necessary to secure the clamp mechanism in the stored position.

The '888 patent discloses a clamp system having a front clamp and a rear clamp. Both the front and rear clamps include a handle for moving the clamp system along a track defined by the support bow. A threaded member comprising a shank and a trunnion member couples the handle to a track defined by the support bow. A pair of wheels are disposed on the trunnion member for guiding each of the clamps between an operational position and a stored position. Additionally, the rear handle is spring loaded for biasing the latch member against the wall. When the clamp system of the '888 patent is in the stored position, the handle is disposed within the track substantially flush with the support bow.

Both the '830 patent and the '888 patent disclose a clamp system having a track defined by the support bow of the frame. The track has a tendency to collect dirt and other debris which interferes with smooth operation of the clamp assembly as well as causing other operational issues. Therefore there remains an opportunity to develop a clamp system for reliably securing a protective cover assembly over a space that is easy to operate.

SUMMARY OF THE INVENTION AND ADVANTAGES

The present invention provides a protective cover assembly for covering a space defined by at least one wall. The protective cover assembly comprises a rail and a support bow coupled to the rail. A material is disposed over the rail and the support bow for covering the space. A clamp mechanism is coupled to the support bow for securing the protective cover assembly over the space. The clamp mechanism includes a latch member for engaging the wall. A handle operatively engages the latch member for moving the latch member between an engaged position and a disengaged position. The clamp mechanism further includes a link interconnecting the support bow and the rail. A collar is slidably coupled to the link for guiding the handle and the latch member between an operational and a stowed position. A rod pivotly couples the collar to the latch member.

Accordingly, the present invention provides a clamp mechanism for securing a protective cover over a space that is both easy and reliable to operate. Each clamp mechanism is easily adjusted within the rails to ensure the cover is properly positioned over the space. The collar smoothly translates along the link while the pivot connection reduces stresses on the rod during operation.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is a partially exploded perspective view of a linking element of the clamp mechanism disposed within a channel defined by a side rail.

FIG. 4A is a top view of a link of the clamp mechanism taken along 4A-4A in FIG. 4.

FIG. 20 is a partial cross-sectional end view taken along 20-20 in FIG. 15 illustrating the collar in the operational portion of the link of the second embodiment.

FIG. 21 is a partial cross-sectional end view taken along 21-21 in FIG. 16 illustrating the collar in the transitional portion of the link of the second embodiment.

FIG. 22 is a partial cross-sectional end view illustrating the collar in the transitional portion of the link of the second embodiment partially rotated about the link.

FIG. 23 is a partial cross-sectional end view taken along 23-23 in FIG. 17 illustrating the collar in the transitional portion of the link of the second embodiment fully rotated about the link.

FIG. 24 is a partial cross-sectional end view taken along 24-24 in FIG. 18 illustrating the collar in a stowed portion on the link of the second embodiment.

DETAILED DESCRIPTION OF THE INVENTION

Figure 1:
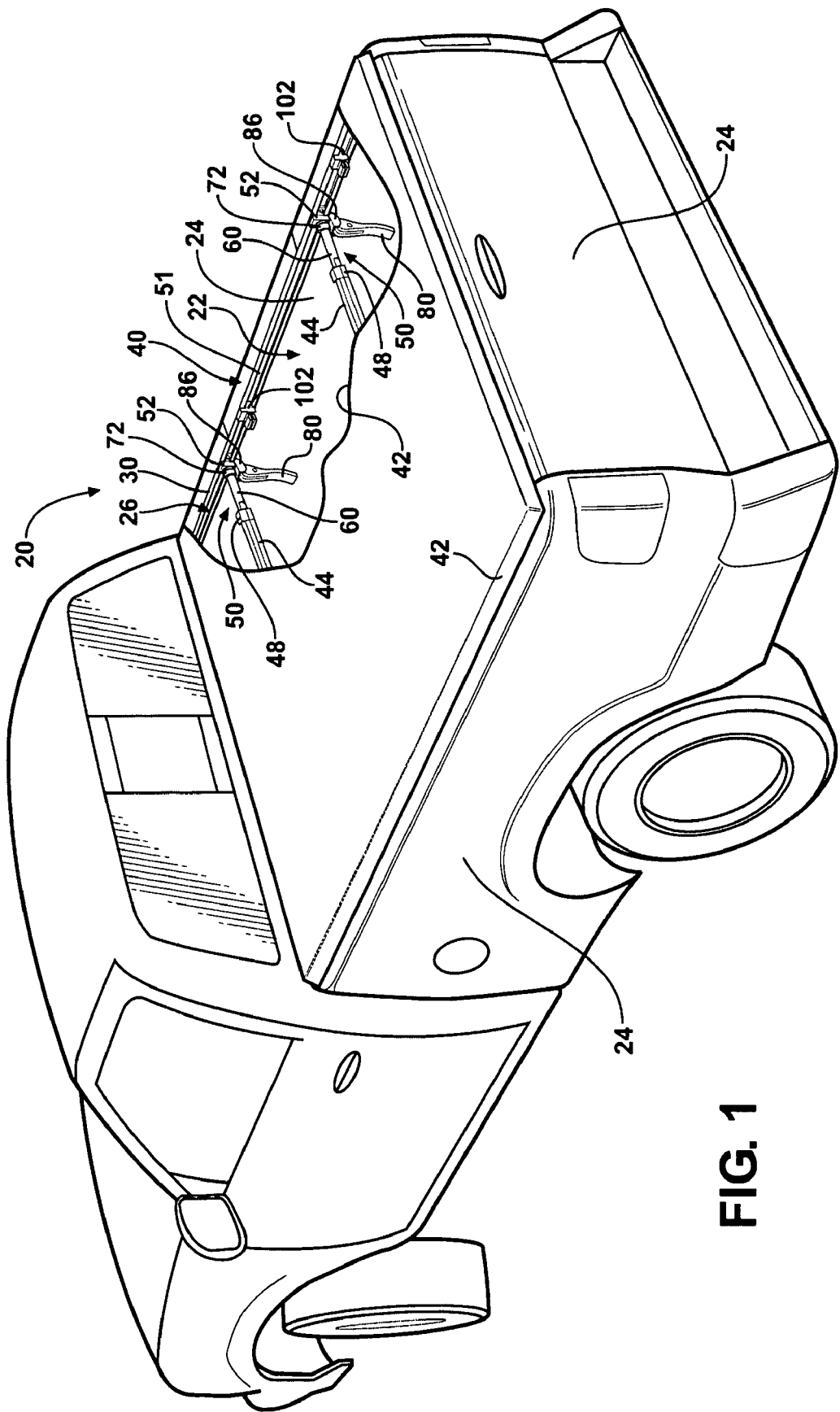
FIG. 1 is perspective view of a pick-up truck including a protective cover assembly with a cut away to show a plurality of clamp mechanisms of the present invention.
Figure 2:
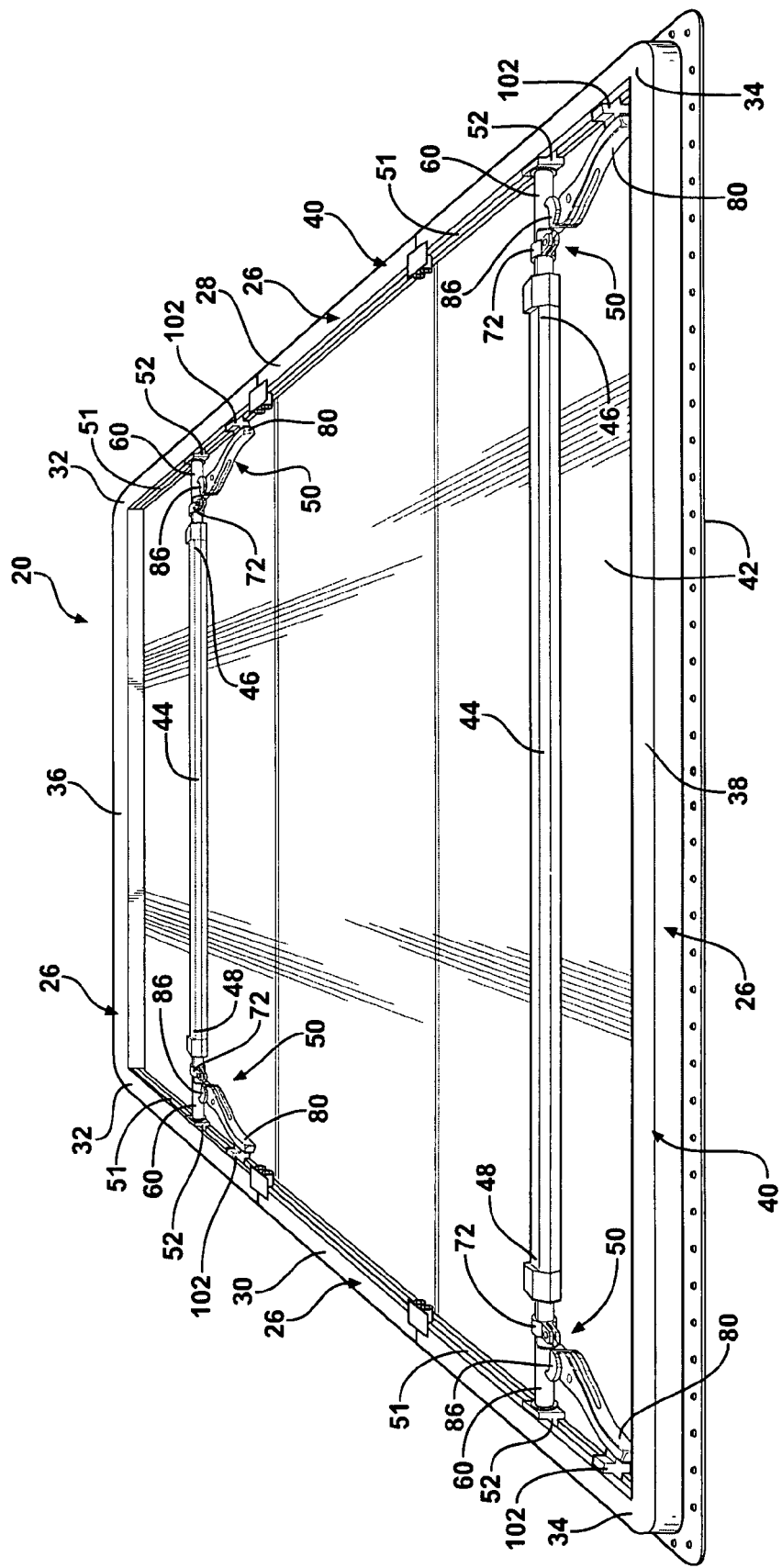
FIG. 2 is a perspective view of an underside of the protective cover assembly.

Referring to the Figures wherein like numerals indicate like or corresponding parts throughout the several views, a protective cover assembly is generally shown at 20 in FIGS. 1 and 2.

Referring specifically to FIG. 1, the protective cover assembly 20 is disposed over a space 22 defined by at least one wall 24. It is to be appreciated that the at least one wall 24 is preferably a plurality of walls for defining the space 22 such as a cargo bed of a pick-up truck.

As best shown in FIGS. 1 and 2, the protective cover assembly 20 includes a plurality of rails 26 disposed about the space 22. Typically, the plurality of rails 26 are defined as a first side rail 28 and a second side rail 30 spaced and substantially parallel to the first side rail 28 and each having a fore end 32 and an aft end 34. The plurality of rails 26 further include a front rail 36 substantially perpendicular and coupled to the fore end 32 of each of the first side rail 28 and the second side rail 30. The plurality of rails 26 still further include a rear rail 38 spaced from and parallel to the front rail 36 and coupled to the aft end 34 of each of the first side rail 28 and the second side rail 30. The rails 26 are coupled to one another to form a frame 40 having an arrangement complimentary in configuration to the space 22.

A material 42 overlays the frame 40 for covering the space 22. The material 42 may be of any suitable design and is preferably a type of water resistant canvas. At least one support bow 44, having a first end 46 and a second end 48, is disposed between and substantially perpendicular to the first side rail 28 and the second side rail 30 for spanning the space 22. Depending on the size of the space 22 to be covered, additional support bows 44 may be required to properly support the material 42. It is to be appreciated that any number of support bows 44 may be utilized without deviating from the subject invention. The support bow 44 is useful to help keep the material 42 taut over the space 22 and to prevent the material 42 from sagging.

A clamp mechanism 50 is coupled to the support bow 44 for securing the protective cover assembly 20 over the space 22. In other words, one clamp mechanism 50 is attached to each of the first end 46 and the second end 48 of the support bow 44. Each clamp member 50 operationally joins the frame 40 to the support bow 44, specifically to the first side rail 28 and the second side rail 30. Referring additionally to FIG. 3, each of the first side rail 28 and the second side rail 30 define a channel 51 having a generally T-shaped configuration. The first side rail 28 and the second side rail 30 are oriented in a mirrored relationship such that each channel 51 faces the other and is open toward the space 22. A linking element 52 having a portion which defines a configuration complementary to the channel 51 slidingly engages the channel 51 for securing the clamp mechanism 50 to each of the side rails 28, 30. Each linking element 52 additionally includes an appendage 54 defining a hole 56. The hole 56 accepts a fastener 58 for securing the linking element 52 within the channel 51.

Figure 4:
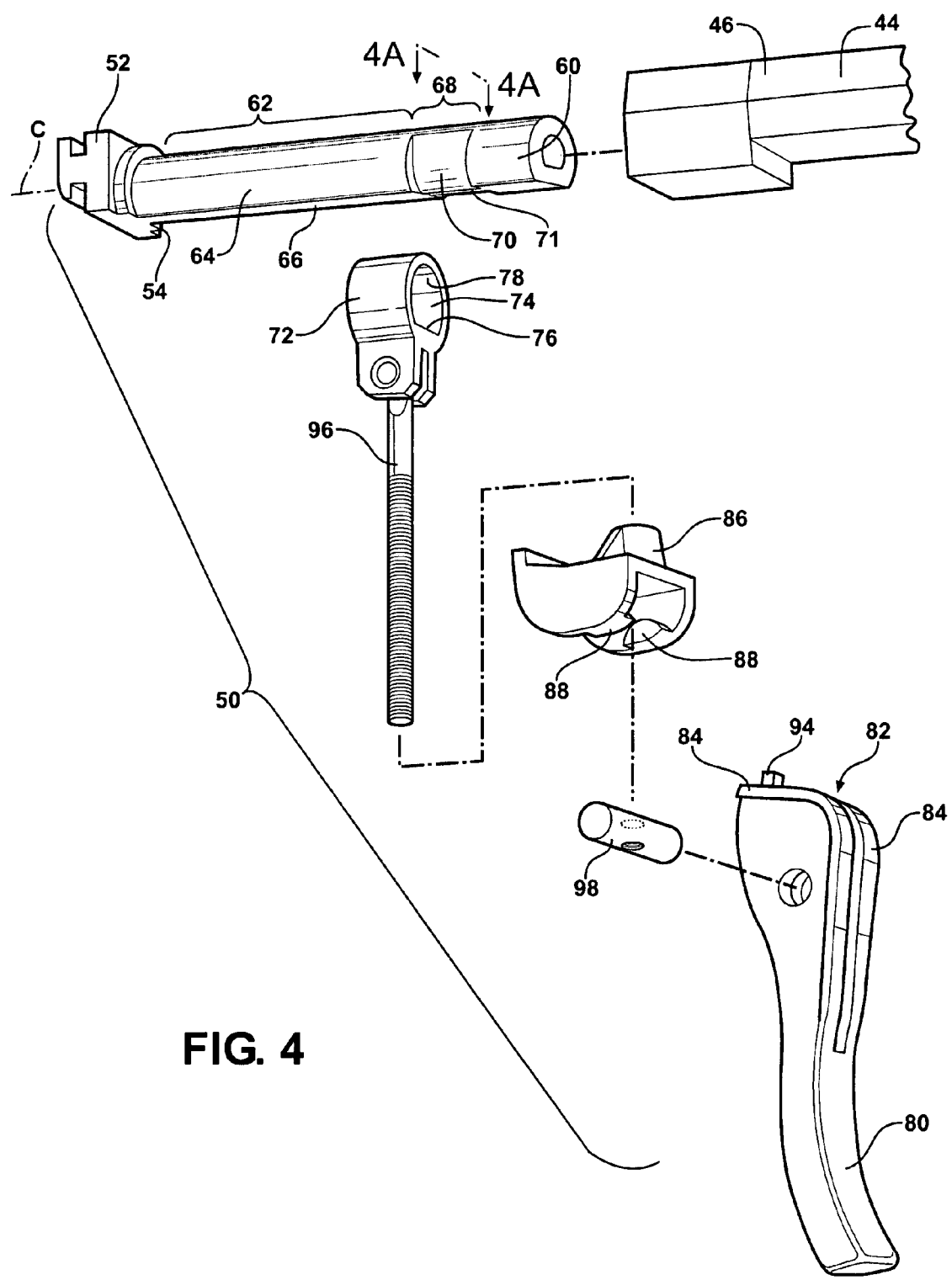
FIG. 4 is a partially exploded perspective view of the clamp mechanism.

The clamp mechanism 50 further includes a link or shaft 60 disposed on the linking element 52 for interconnecting the linking element 52 and the support bow 44. In other words, the link or shaft 60 is disposed on the linking element 52. For descriptive purposes only, the link or shaft 60 will be subsequently described as the shaft 60. As best shown in FIG. 4, the shaft 60 defines a first cross-sectional configuration along an operational portion 62 of the shaft 60. The first cross-sectional configuration includes a first arcuate section 64 having a first diameter and a flat section 66. The first cross-sectional configuration is further defined as having a D-shaped configuration. However, it is to be appreciated that the shaft 60 may define other suitable configurations without deviation from the subject invention.

As best shown in FIG. 4A, the shaft 60 further defines a second cross-sectional configuration along a stowed portion 68 of the shaft 60. The second cross-sectional configuration presents a set of second flat sections 70 interconnected by a second arcuate section 71 having a second diameter substantially smaller than the first diameter of the first arcuate section. The shaft 60 defines a central axis C and is symmetrical about the central axis C.

The clamp mechanism 50 further includes a collar 72 that is adapted to be coupled to the shaft 60. Specifically, the collar 70 is adapted to move along the shaft 60. In one embodiment of the clamp mechanism, as shown is FIG. 4, the collar 72 defines an aperture 74 having a flat segment 76 and an arcuate segment 78 that is complementary in configuration to the first cross-sectional configuration of the shaft 60 for restricting movement to only translation along the operational portion 62 of the shaft 60 and preventing rotation of the collar 72 about the operational portion 62 of the shaft 60. The collar 72 is able to rotate about the shaft 60 when in the stowed portion 68 of the shaft 60. Operation of the clamp mechanism 50 will be discussed in greater detail below.

Figure 5:
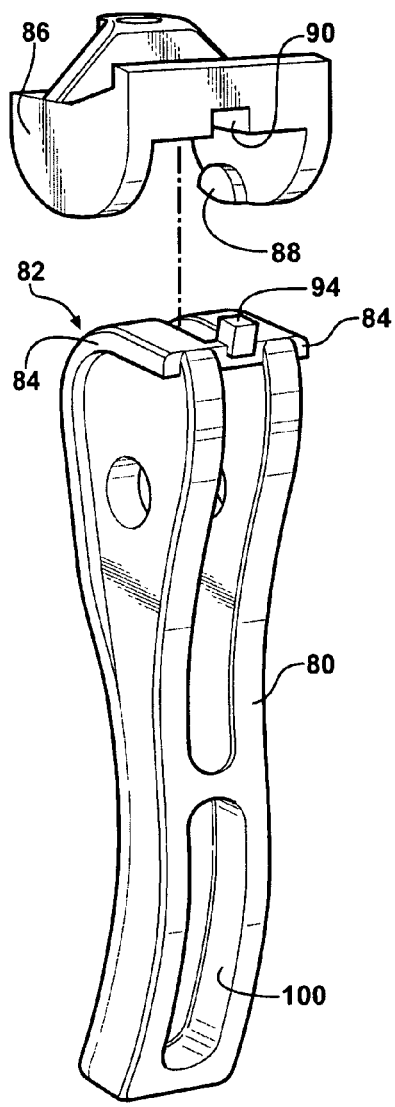
FIG. 5 is an exploded perspective view of a handle and a latch member of the clamp mechanism.

Referring additionally to FIG. 5, the clamp mechanism 50 also includes a handle 80. The handle 80 defines a cammed profile 82 and a pair of ridges 84 projecting from the cammed profile 82 for defining a path. The clamp mechanism further includes a latch member 86 defining a substantially U-shaped configuration and having a pair of followers 88 disposed within the U-shaped configuration. The latch member 86 is operationally coupled to the handle 80. The followers 88 ride along the path defined by the ridges 84 between an engaged position and a disengaged position. The path-follower relationship of the handle 80 to the latch member 86 ensures smooth operation between the engaged position and the disengaged position.

Figure 6A:
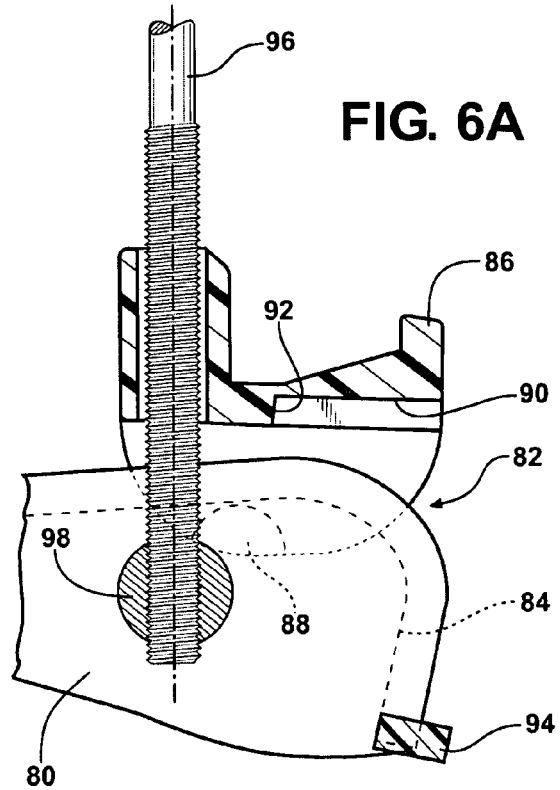
FIG. 6A is a fragmented partial cross-sectional side view of the handle and the latch member in a disengaged position.
Figure 6B:
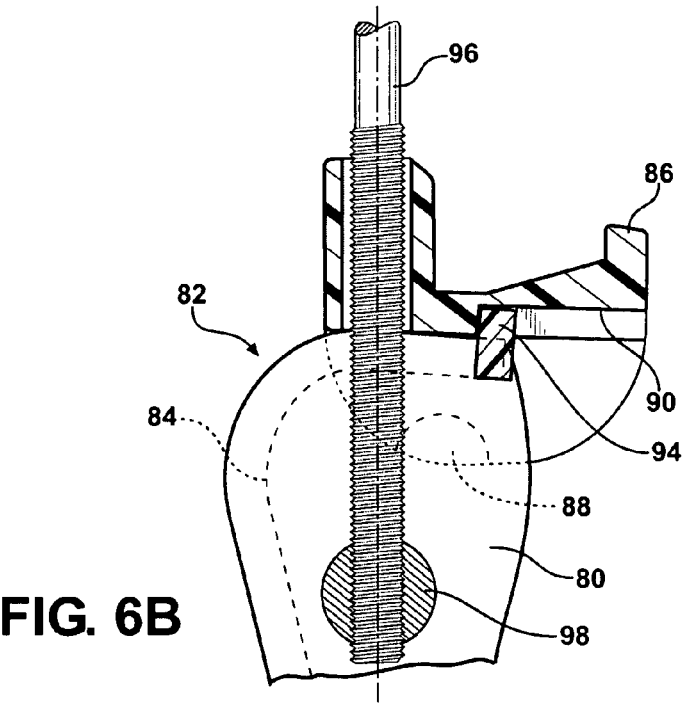
FIG. 6B is a fragmented partial cross-sectional side view of the handle and the latch member in an engaged position.

Referring additionally to FIGS. 6A and 6B, the latch member 86 defines a groove 90 between the followers 88 and the groove 90 includes an end wall 92. The handle 80 also includes a tab 94 disposed between the ridges 84. The groove 90 is configured to accept the tab 94 for restricting movement of the handle 80 relative to the latch member 86. As best shown in FIG. 6B, the end wall 92 acts as a positive stop for the tab 94 to ensure that the handle 80 stops in a position for exerting a biasing force against the latch member 86 when in the engaged position.

The clamp mechanism 50 further includes a rod 96 pivotly coupled to the collar 72. The rod 96 has a plurality of threads disposed thereupon. An elongated nut 98 is disposed within the handle 80 for threadingly accepting the rod 96 and coupling the collar 72 to the handle 80 and latch member 86. The latch member 86 may be adjusted to accommodate various applications by rotating the handle 80 and moving the latch member 86 along the rod 96. The pivot connection between the rod 96 and the collar 72 is beneficial for reducing stresses imparted on the rod 96 when moving the handle between the engaged and disengaged positions.

Figure 9:
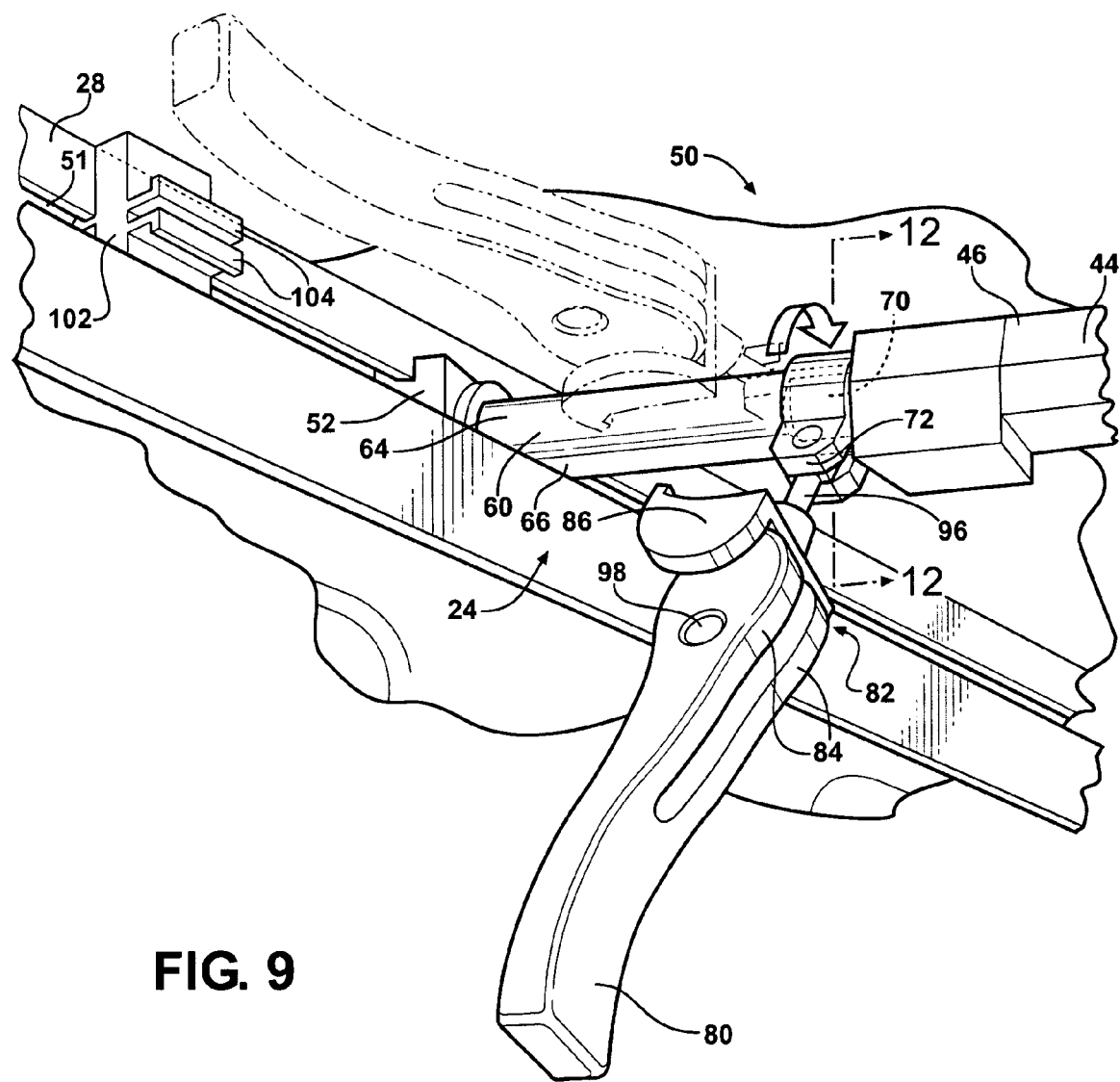
FIG. 9 is a perspective view of the clamp mechanism illustrating rotation of the handle and the latch member about the stowed portion of the link.

As best shown in FIG. 5, the handle 80 defines a recess 100 having a predetermined width and a predetermined depth. Referring now to FIG. 9, a clip 102 also slidingly engages the channel 51 defined by the side rails 28, 30 and is disposed adjacent each clamp mechanism 50. The clip 102 has a pair of fingers 104 spaced from one another. Together the fingers 104 present a total width slightly larger than the predetermined width of the recess 100 such that an interference fit may be achieved when the recess 100 defined by the handle 80 is pushed over the fingers 104 of the clip 102 for securing the handle 80 against one of the side rails 28, 30 thereby securing the handle 80 and the in a stowed position on the stowed portion 68 of the shaft. When this occurs, the fingers 104 are biased inwardly toward one another with a spring bias and a frictional force of the interference fit acting to hold the handle 80 in place on the clip 102.

Referring specifically to FIGS. 7-13, an example of the operation of the clamp mechanism 50 will be discussed to illustrate the movement of the handle 80 and the latch member 86 from an operational position for securing the protective cover assembly 20 over the space 22 to the stowed position of the handle 80 and latch member 86 when the space 22 needs to be accessed or when the protective cover assembly 20 is to be stored.

Figure 8:
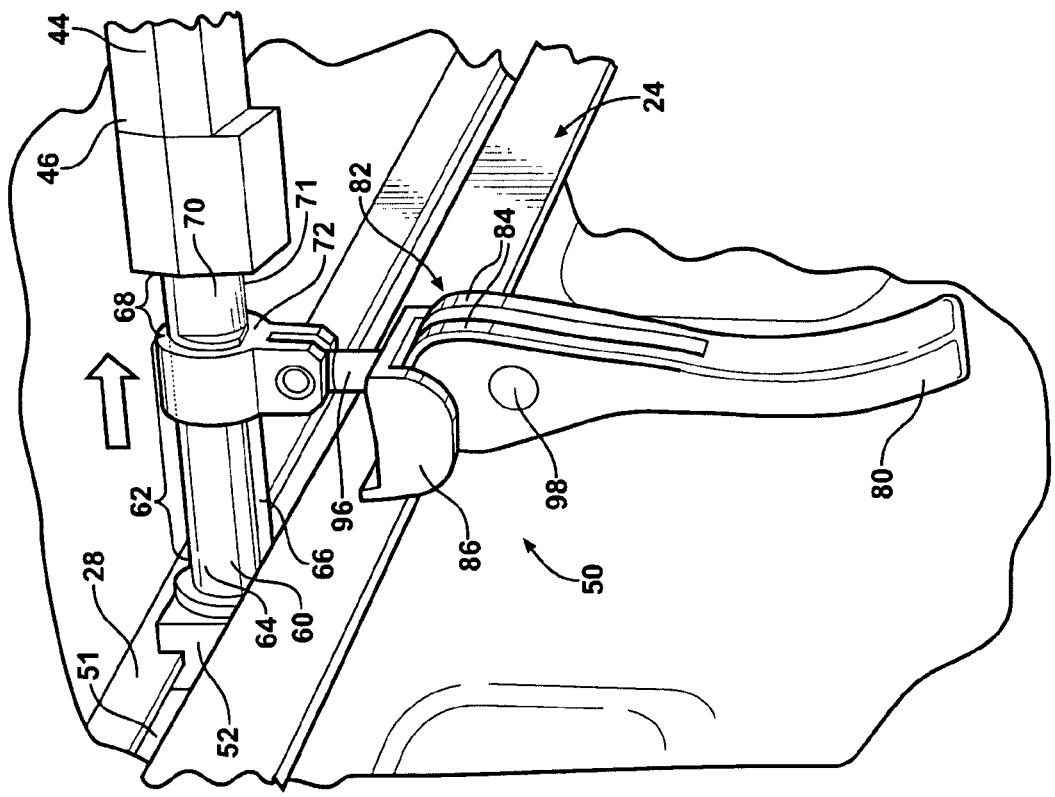
FIG. 8 is a perspective view of the clamp mechanism showing the latch member disengaged from a wall defining a space and moving toward a stowed portion of the link.
Figure 7:
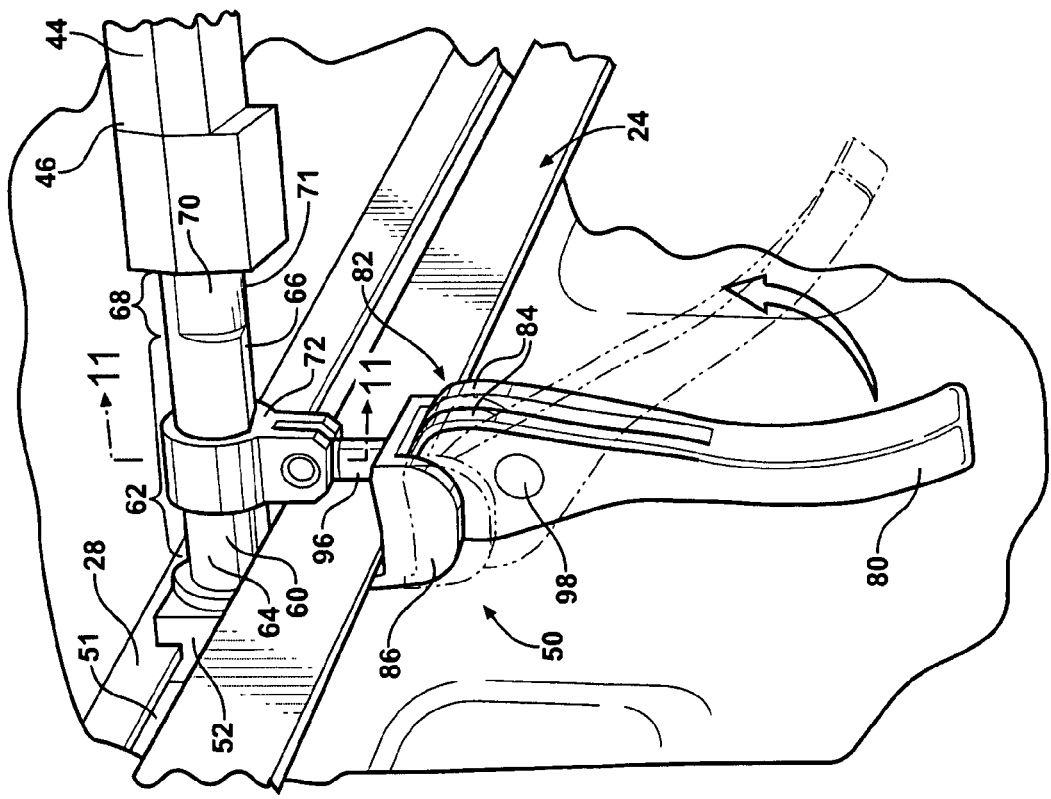
FIG. 7 is a perspective view of the clamp mechanism showing the handle and the latch member in the engaged position and illustrating movement of the handle and the latch member in phantom toward the disengaged position.

As shown in FIG. 7, the handle and latch member 86 of the clamp mechanism 50 are in the operational position and the latch member 86 is in contact with the wall 24 defining the space 22. The cammed profile 82 of the handle 80 provides the biasing force necessary, when in the engaged position, to secure the protective cover assembly 20 over the space 22. To move the latch member 86 to a disengaged position, the handle 80 is rotated about the elongated nut 98 disposed within the handle 80, as illustrated in phantom. The biasing force is removed and the latch member 86 disengages from the wall 24. Referring to FIG. 8, the latch member 86 is pulled away from the wall 24 and the handle 80 is returned to the engaged position for ease of operation. A user grasps the handle 80 to translate the collar 72 along the operational portion 62 of the shaft 60 toward the stowed portion 68.

Figure 10:
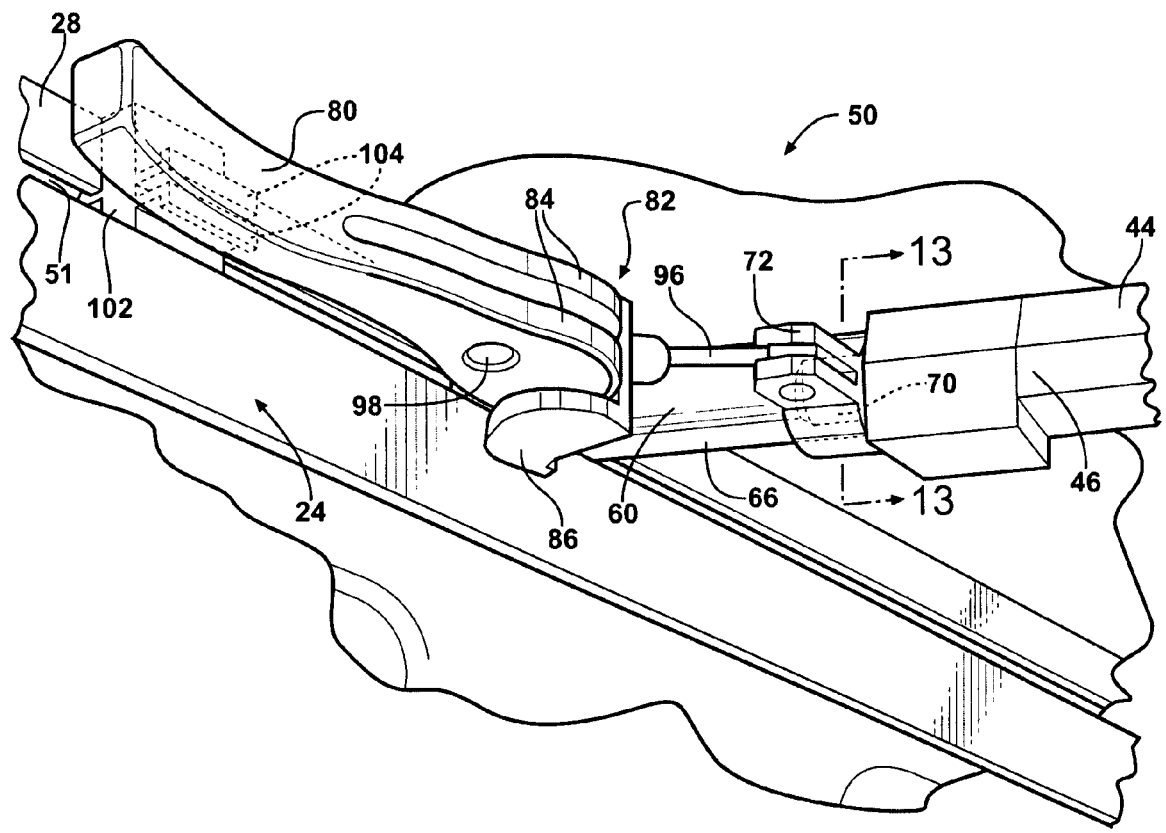
FIG. 10 is a perspective view of the clamp mechanism showing the handle and the latch member in a stowed position.
Figure 11:
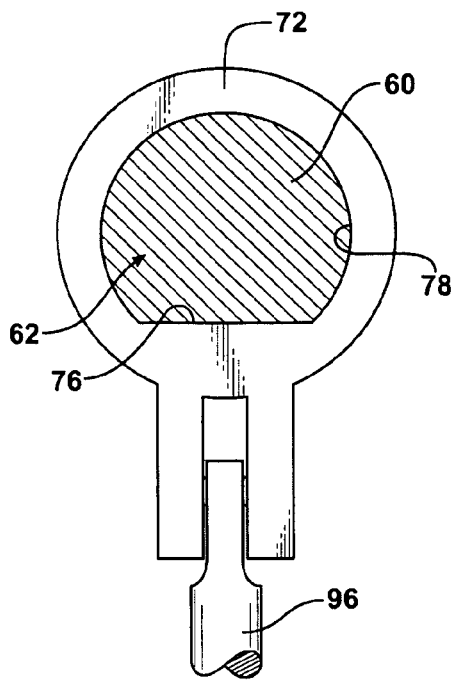
FIG. 11 is a partial cross-sectional end view taken along 11-11 in FIG. 7 showing a collar of the clamp mechanism in an operational portion of the link.
Figure 12:
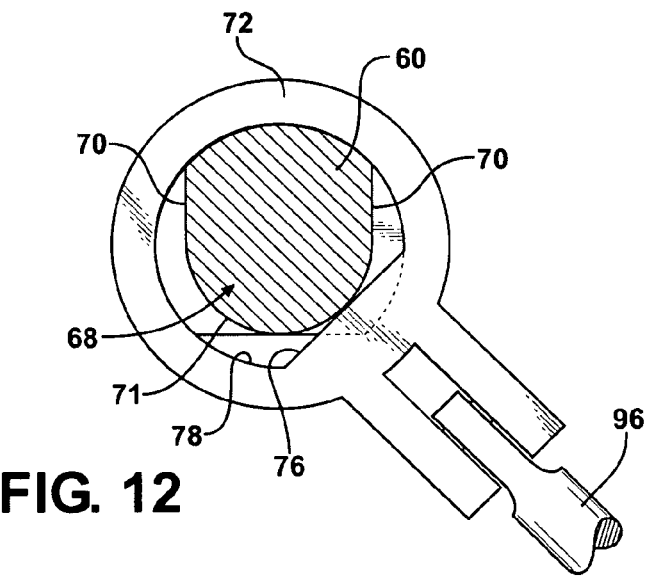
FIG. 12 is a partial cross-sectional end view taken along 12-12 in FIG. 9 illustrating the collar rotating about the stowed portion of the link.
Figure 13:
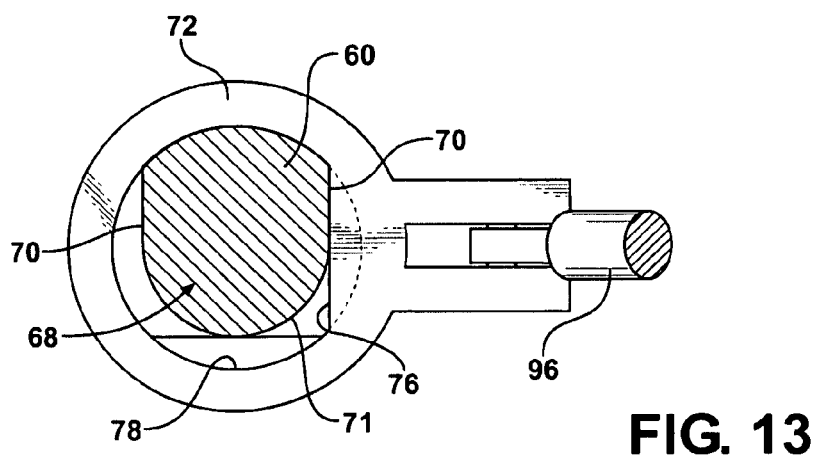
FIG. 13 is a partial cross-sectional view taken along 13-13 in FIG. 10 showing the collar in the stowed position.

As stated above, the stowed portion 68 of the shaft 60 is adjacent the operational portion 62 of the shaft 60. Referring to FIG. 9, when the collar 72 reaches the stowed portion 68 of the shaft 60, the collar 72 may rotate about the shaft 60. The collar 72 rotates approximately 90 degrees; however, any amount of rotation may be employed without deviating from the subject invention. When the collar 72 is rotated about the stowed portion 68 of the shaft 60, the flat segment 76 of the aperture 74 defined by the collar 72 is no longer aligned with the flat section 66 of the shaft 60. Therefore the collar 72 is restricted from moving back onto the operational portion 62 of the shaft 60. The flat segment 76 of the aperture 74 may be realigned with the flat section 66 of the shaft 60 for allowing the collar to reenter the operational portion 62 of the shaft 60. As best shown in FIG. 10, the handle 80 and latch member 86 are then urged toward one of the first side rail 28 or second side rail 30 and the recess 100 defined by the handle 80 couples with the clip 102 for securing the handle 80 and latch member 86 against the one of the side rails 28, 30.

Depending on the application, multiple clamp mechanisms 50 may be employed. The same steps would be followed to disengage each latch member 86 and move the handle 80 and latch member 86 into the stowed position.

To secure the protective cover assembly 20 over the space 22 the procedure recited above would simply be reversed. The handle 80 is pulled away from the side rail 28,30 to disengage the clip 102 from the recess 100 defined by the handle 80. When the handle 80 is free of the clip 102, the collar 72 is able to rotate about the shaft 60 and the aperture 74 is aligned with the first cross-sectional configuration of the operational portion 62 of the shaft 60. The collar 72 is translated along the operational portion 62 of the shaft 60 toward the wall 24 defining the space 22. The handle 80 is rotated about the elongated nut 98 to the disengaged position and the latch member 86 lowers and engages the wall 24. The handle 80 is then rotated about the elongated nut 98 again to the engaged position for biasing the latch member 86 against the wall 24.

Figure 14:
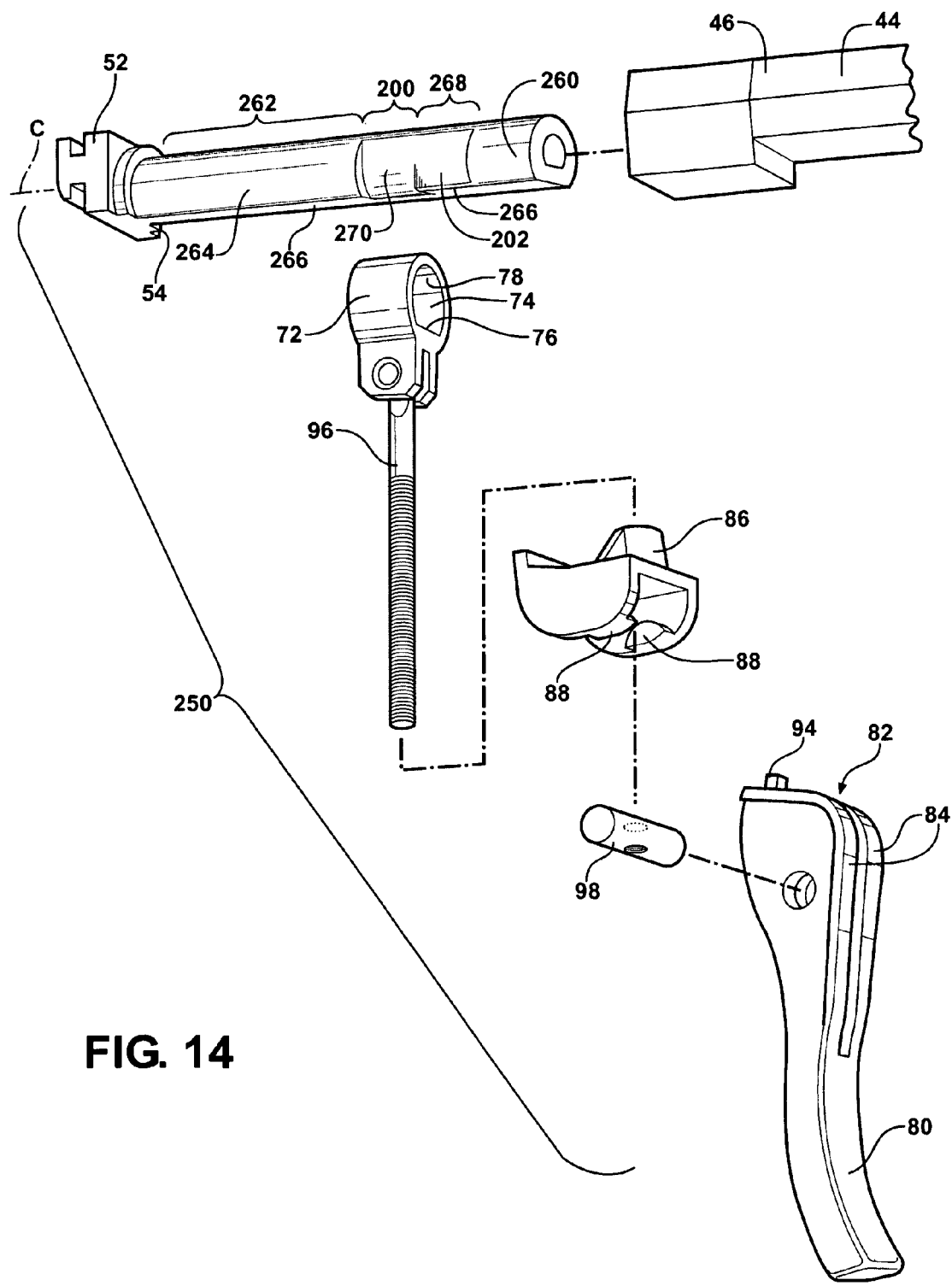
FIG. 14 is a partially exploded view of a clamp mechanism of a second embodiment.

As shown in FIG. 14, a second embodiment utilizes components that are substantially similar to the primary embodiment. However a shaft 260 defines a different configuration from that of the shaft 60 of the first embodiment. In the second embodiment, the shaft 260 defines three cross-sectional configurations. The first cross-sectional configuration is defined as the operational portion 262 and is substantially similar to the operational portion 62 of the primary embodiment described above. The first cross-sectional configuration has a first arcuate section 264 and a first flat section 266 and is also defined as D-shaped. Similar to the primary embodiment, the first cross-sectional configuration restricts movement of the collar 72 to only translation along the operational portion 262 of the shaft 260 and prohibits rotation about the operational portion 262 of the shaft 260.

The shaft 260 of the second embodiment further defines a second cross-sectional configuration. The second cross-sectional configuration of the second embodiment is defined as a transitional portion 200 and is disposed adjacent the operational portion 262. The transitional portion 200 comprises a second arcuate section 270. The second arcuate section 270 is recessed from the first arcuate section 264 for allowing the collar 72 to rotate about the shaft 260. However, unlike the primary embodiment described above, the collar 72 may only rotate about the shaft 260 in a single direction. The shaft 260 of the second embodiment also defines a central axis C, however the shaft 260 is not symmetrical about the central axis C.

The shaft 260 also defines a third cross-sectional configuration. The third cross-sectional configuration is defined as a stowed portion 268 and has a second flat section 202 substantially perpendicular to the first flat section 266 for allowing the collar 72 to slide over and lock into a stored position such that the handle 80 cantilevers out substantially perpendicular to the support bow 44.

Figure 16:
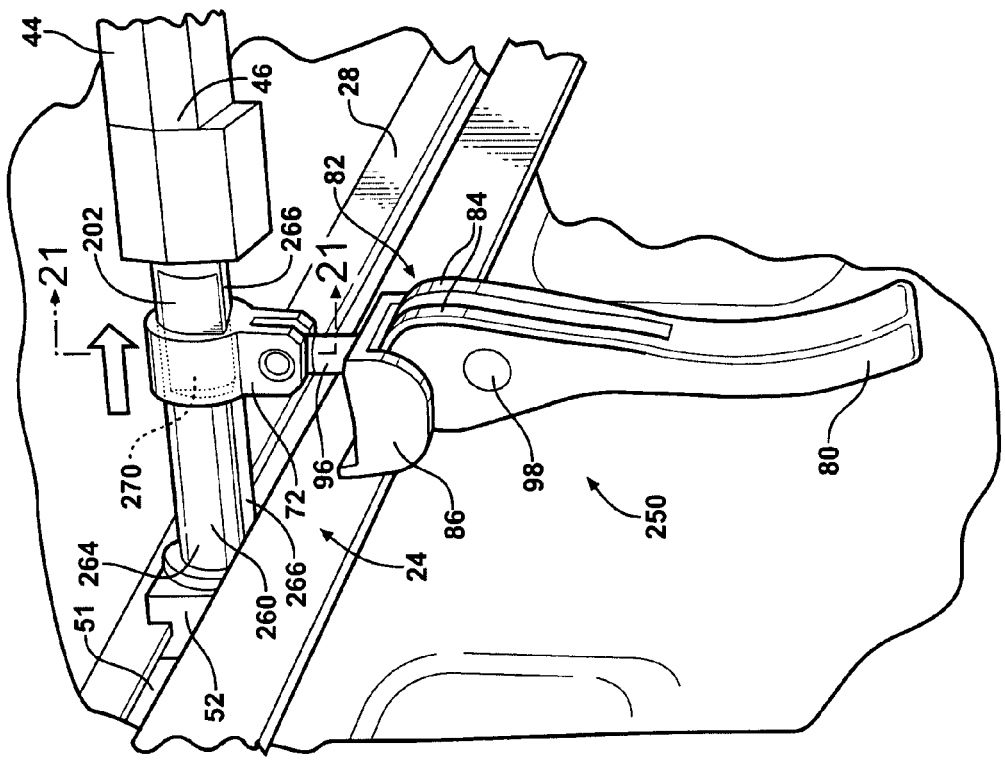
FIG. 16 is a perspective view of the clamp mechanism of the second embodiment showing the latch member disengaged from the wall and illustrating movement into a transitional portion on a link of the second embodiment.
Figure 15:
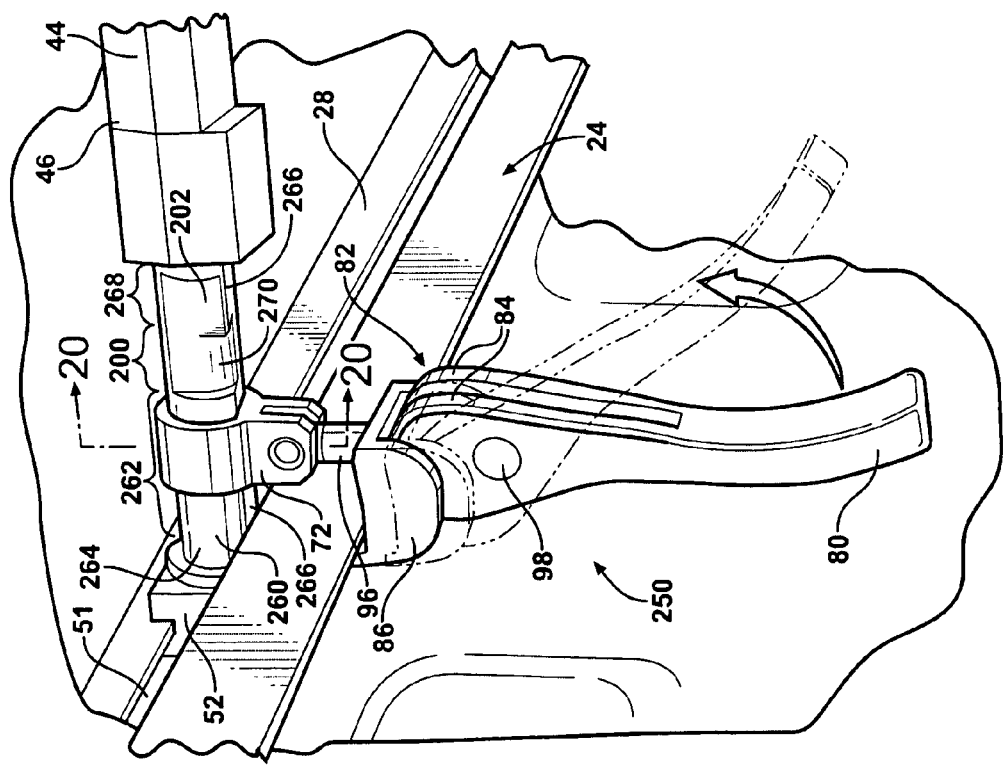
FIG. 15 is a perspective view of the clamp mechanism of the second embodiment showing the handle and the latch member in the engaged position and illustrating movement of the handle and the latch member in phantom to the disengaged position.
Figure 17:
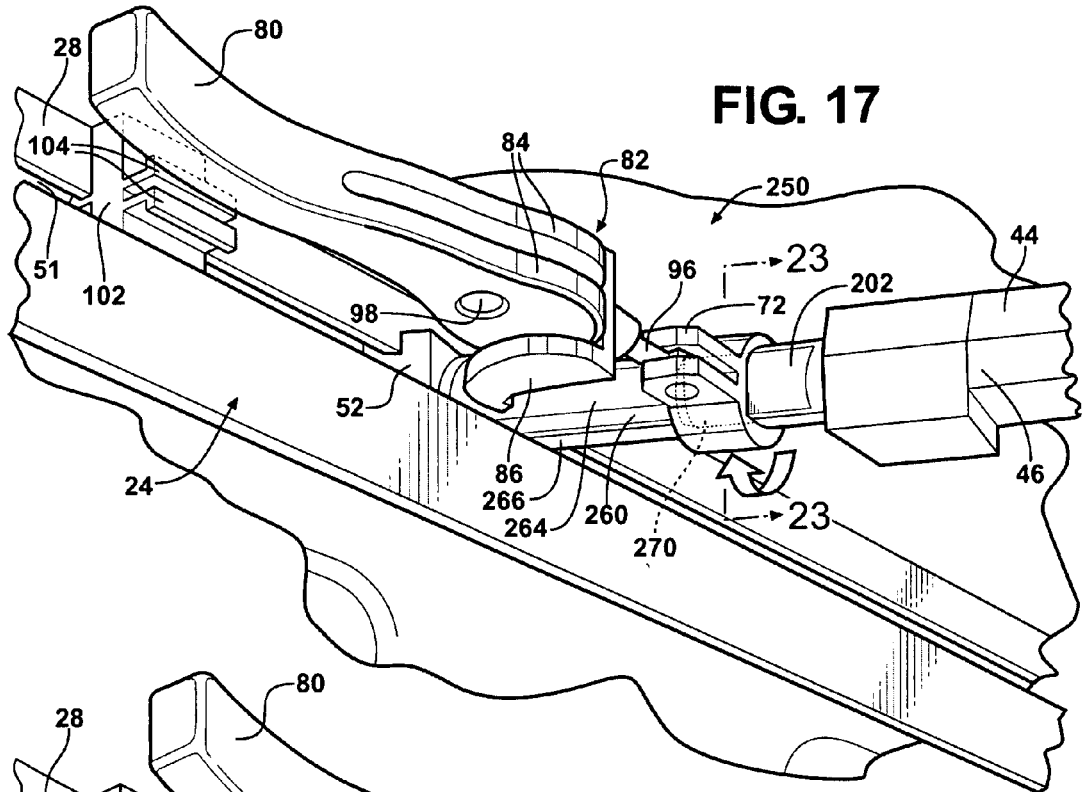
FIG. 17 is a perspective view of the clamp mechanism of the second embodiment illustrating rotation of the handle and the latch member about the transitional portion of the link.
Figure 18:
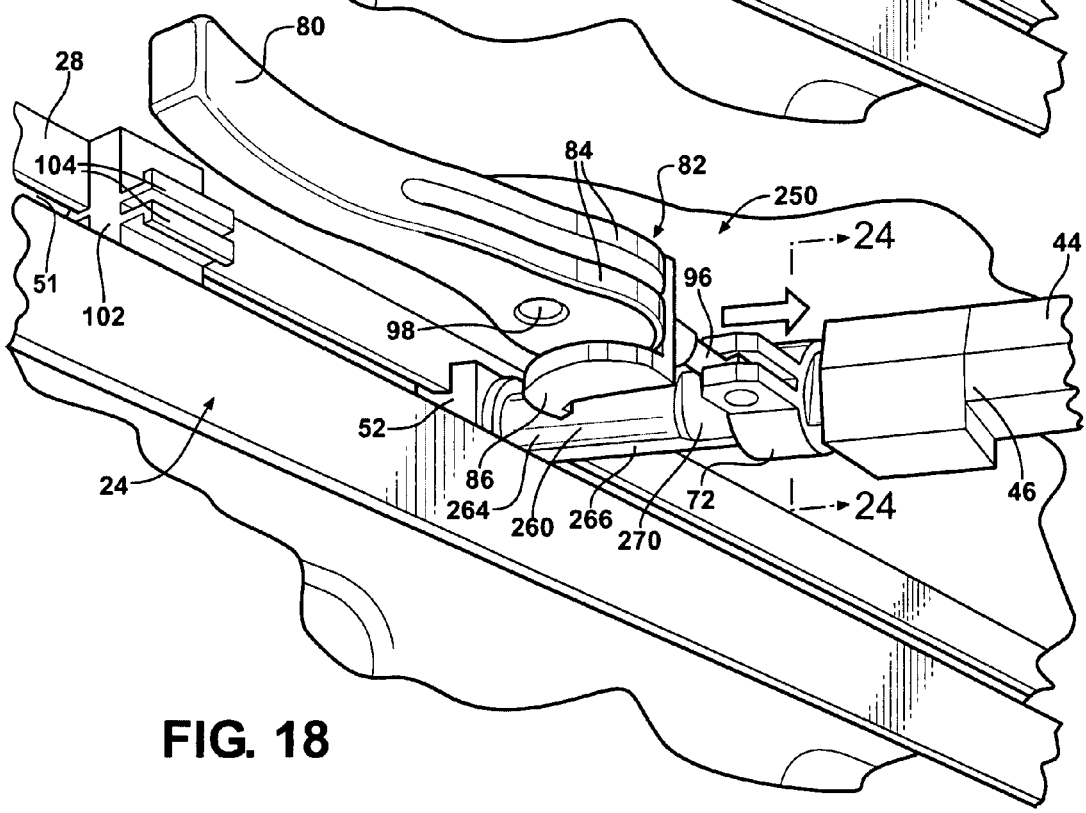
FIG. 18 is a perspective view of the clamp mechanism of the second embodiment showing the handle and the latch member in a stowed portion of the link with the handle and the latch member cantilevered substantially perpendicular to the link.
Figure 19:
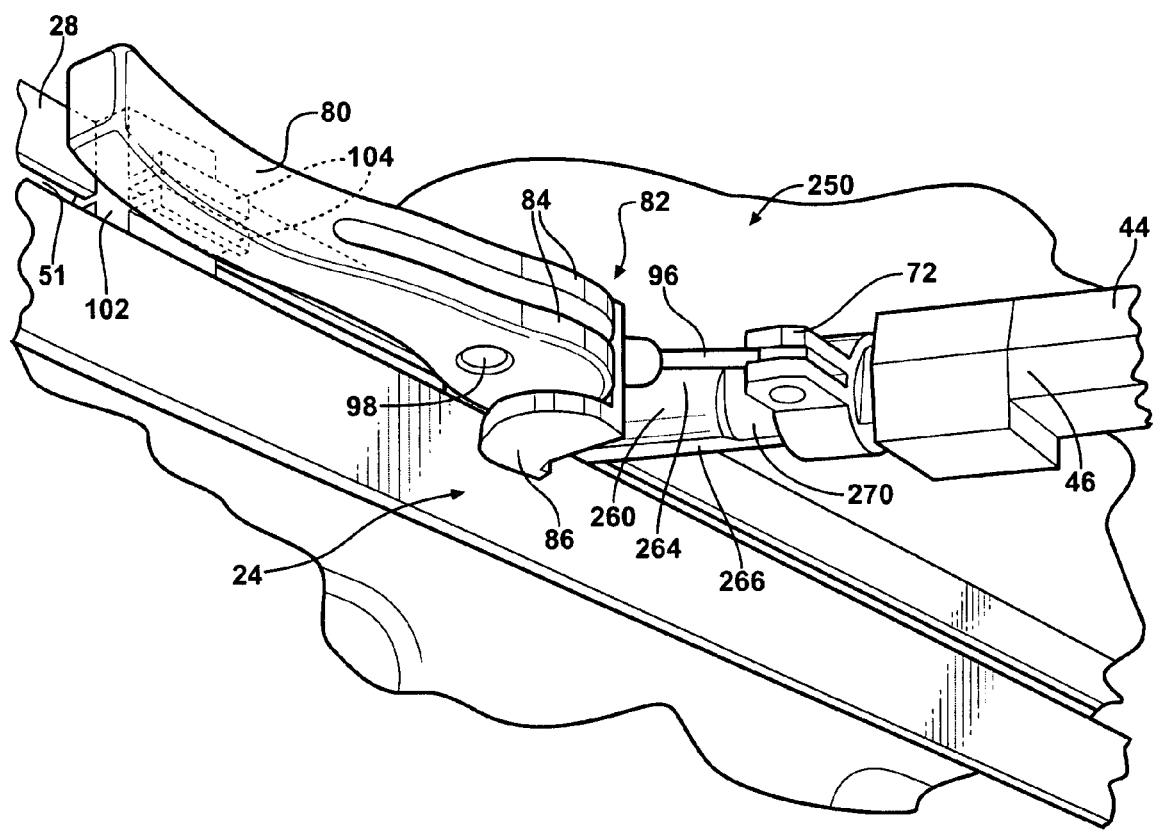
FIG. 19 is a perspective view of the clamp mechanism of the second embodiment showing the handle and the latch member in a stowed position.

Operation of the clamp mechanism 250 of the second embodiment is similar to that of the primary embodiment described above. As shown in FIG. 15, the handle 80 and the latch member 86 of the clamp mechanism 250 are in the engaged position and the latch member 86 is in contact with the wall 24 defining the space 22. The cammed profile 82 of the handle 80 provides the biasing force necessary to secure the protective cover assembly 20 over the space 22. To move the latch member 86 to a disengaged position, the handle 80 is rotated about the elongated nut 98 disposed within the handle 80, as illustrated in phantom. The biasing force is removed and the latch member 86 disengages from the wall 24. Referring to FIG. 16, the latch member 86 is pulled away from the wall 24 and the handle 80 is returned to the engaged position for ease of operation. The user grasps the handle 80 to translate the collar 72 along the operational portion 262 of the shaft 260 toward the transitional portion 200. As shown in FIG. 17, when the collar 72 is in the transitional portion 200 of the shaft 260 the collar 72 may rotate about the shaft 260. However, in the second embodiment when the collar 72 is rotated and the flat segment 76 of the aperture 74 defined by the collar 72 is aligned with the second flat section 202 on the shaft 260, the collar 72 is pushed over to the stowed portion 268. When the collar 72 is in the stowed portion 268 of the shaft 260; the handle 80, the latch member 86, and the rod 96 are held substantially perpendicular to the shaft 260, as shown in FIG. 18. Referring to FIG. 19, the handle 80 may be secured adjacent the side rail 28,30 with the clip 102 disposed within the channel defined by the side rail 28,30, similar to the primary embodiment described above.

Figure 25:
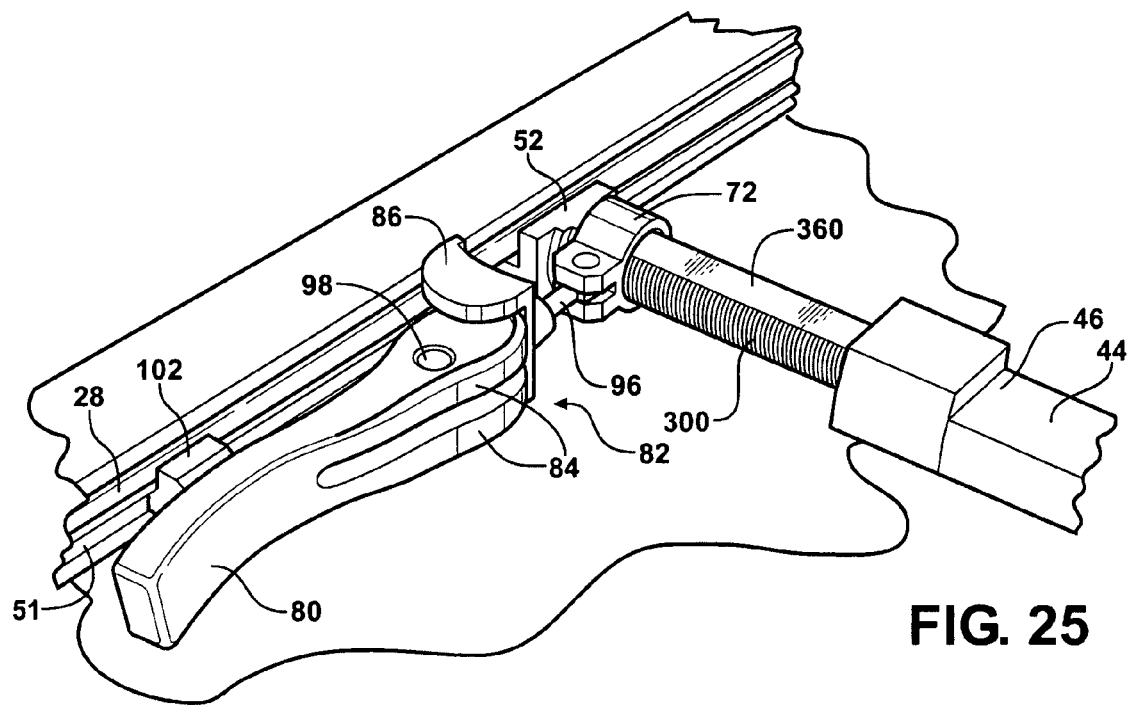
FIG. 25 is a perspective view of a clamp mechanism of a third embodiment having a plurality of ribs disposed along a link.

Referring now to FIG. 25, in a third embodiment, a plurality of ribs 300 are disposed along the arcuate section of the shaft 360. A second plurality of ribs (not shown) are correspondingly disposed within the collar 72 for meshing with the plurality of ribs disposed 300 along the shaft 360 for resisting an unwanted movement of the collar 72 with respect to the shaft 360 when in the engaged position.

Figure 26:
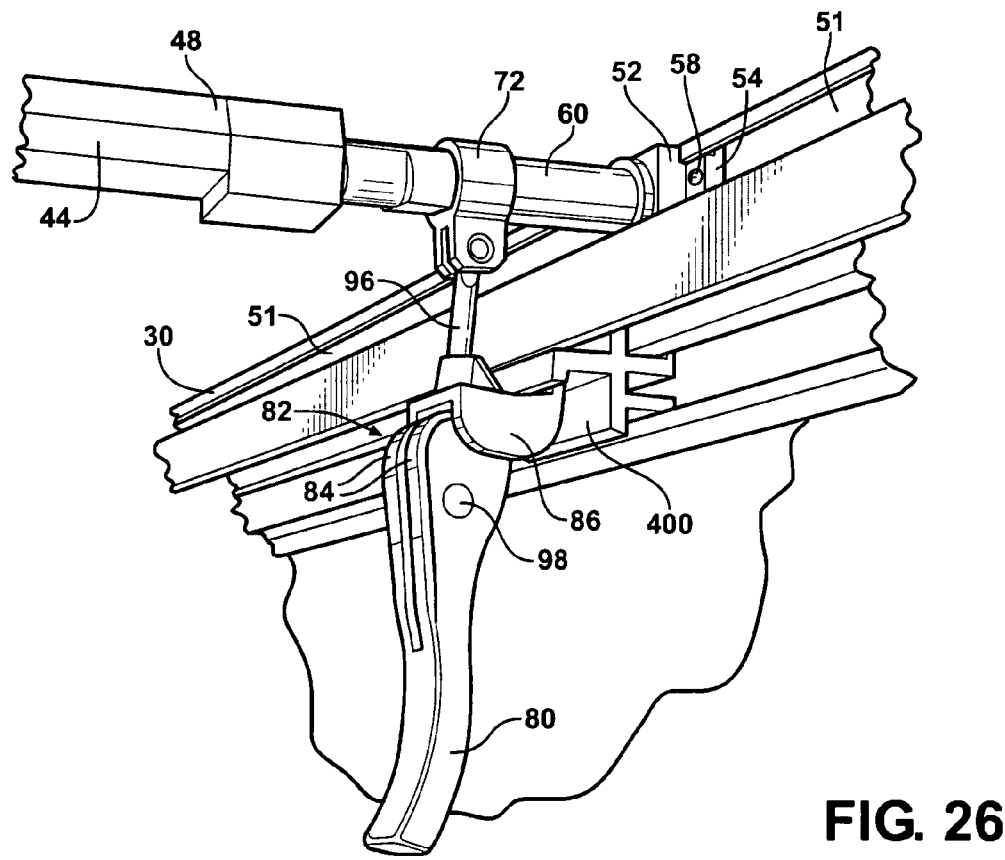
FIG. 26 is a perspective view of a clamp mechanism of a fourth embodiment having a latching bracket adapted to engage the wall defining the space.

In a fourth embodiment, shown in FIG. 26, a latching bracket 400 may be adapted to engage the at least one wall 24 for accepting the latch member 86 in cases where having the latching member engage the wall 24 directly is not desired or is not practical.

Although each embodiment has been described as having a cross-sectional configuration for allowing rotation of the collar 72 about the shaft 60, 260 disposed adjacent the support bow 44, this cross-sectional configuration for allowing rotation may also be located adjacent the wall 24 defining the space 22. In other words, the cross-sectional configuration for allowing rotation of the collar 72 about the shaft 60, 260 may be located anywhere along the shaft 60, 260 without deviating from the subject invention.

The present invention has been described in an illustrative manner, and it is to be understood that the terminology which as been used in intended to be in the nature of words of description rather than of limitation. Obviously, many modifications and variations of the present invention are possible in light of the above teachings. The invention may be practiced otherwise than as specifically described within the scope of the appended claims.

What is claimed is:

1. A protective cover assembly for covering a space defined by at least one wall of a bed of a truck, said protective cover assembly comprising;
   a rail,
   a support bow coupled to said rail,
   a material disposed over said rail and said support bow for covering the space of the bed of the truck,
   a clamp mechanism coupled to said support bow for securing said protective cover assembly over the space, said clamp mechanism including:
      a latch member for engaging the at least one wall,
      a handle operatively engaging said latch member for moving said latch member between an engaged position and a disengaged position,
      a link interconnecting said support bow and said rail,
      a collar coupled to said latch member and slidably coupled to said link when in both an operational and a stowed position for guiding said handle and said latch member between the operational position and the stowed position along said link, and
      a rod pivotally coupled to said collar and operatively engaging said latch member.

2. The cover assembly as set forth in claim 1 wherein said link is further defined as a shaft having a first cross-sectional configuration along said operational portion of said shaft with said first cross-sectional configuration having an arcuate section and a flat section.

3. The cover assembly as set forth in claim 2 wherein said collar defines an aperture having a shape complementary in configuration to said first cross-sectional configuration to prevent rotation of said collar relative to said shaft.

4. The cover assembly as set forth in claim 2 wherein said first cross-sectional configuration is further defined as D-shaped.

5. The cover assembly as set forth in claim 2 wherein said shaft further defines a second cross-sectional configuration along a stowed portion of said shaft for allowing said handle and latch member to rotate about said shaft and into said stowed position.

6. The cover assembly as set forth in claim 1 wherein said latch member is adjustable along said rod.

7. The cover assembly as set forth in claim 6 wherein said rod includes a plurality of threads and wherein said handle includes a female threaded fastener disposed within for threadingly accepting said rod.

8. The cover assembly as set forth in claim 1 wherein said handle defines a cammed profile for biasing said latch member against the at least one wall when in said engaged position.

9. The cover assembly as set forth in claim 8 wherein said handle includes a tab and said latch member defines a groove having an end wall and said groove is positioned to accept said tab for restricting movement of said handle relative to said latch member.

10. The cover assembly as set forth in claim 9 wherein said end wall prevents said tab from moving beyond a predetermined position within said latch member.

11. The cover assembly as set forth in claim 9 wherein said handle further includes a pair of ridges disposed along opposite sides of said cammed profile and wherein said latch member further includes followers for riding along said ridges when said latch member is moving between said engaged position and said disengaged position.

12. The cover assembly as set forth in claim 1 wherein said rail is further defined as a first side rail and a second side rail spaced and substantially parallel to said first side rail and further including a front rail and a rear rail spaced and substantially parallel to said front rail and substantially perpendicular to said first side rail and said second side rail forming a frame complementary in configuration to the space.

13. The cover assembly as set forth in claim 1 wherein said link includes a linking element for coupling said link to one of said first and second side rails wherein each of said first side rail and said second side rail defines a channel for accepting said linking element.

14. The cover assembly as set forth in claim 13 wherein said linking element includes an appendage and a fastener disposed through said appendage for securing said linking element within said channel.

15. The cover assembly as set forth in claim 13 further including a clip disposed in said channel defined by said rail and wherein said handle defines a recess for accepting said clip and securing said handle against one of said first and second side rails when said handle and latch member is in said stowed position.

16. The cover assembly as set forth in claim 1 wherein said link includes a first plurality of ribs disposed along said link.

17. The cover assembly as set forth in claim 16 wherein said collar includes a second plurality of ribs for mating with said first plurality of ribs for restricting movement of said collar along said link.

18. The cover assembly as set forth in claim 1 further including a latching bracket adapted to engage the at least one wall and hold said latch member in said engaged position.

19. The cover assembly as set forth in claim 1 further including a second clamp mechanism coupled to said support bow opposite said clamp mechanism for securing said protective cover assembly over the space.

20. The cover assembly as set forth in claim 1 wherein said link defines a first cross-sectional configuration along an operational portion of said link and said collar defines an inner surface having a shape complementary in configuration to said first cross-sectional configuration to prevent rotation of said collar relative to said link.

21. The cover assembly as set forth in claim 20 wherein said link further defines a second cross-sectional configuration along said link for allowing said handle and said latch member to rotate about said link and into said stowed position.

22. The cover assembly as set forth in claim 1 wherein said collar is configured to directly engage said link and be supported by said link for supporting said handle and said latch member relative to said link.

23. The cover assembly as set forth in claim 22 wherein said collar includes an annular portion engaging said link.

24. A protective cover assembly for covering a space defined by at least one wall of a bed of a truck, said protective cover assembly comprising;
a rail,
a support bow coupled to said rail,
a material disposed over said rail and said support bow for covering the space of the bed of the truck,
a clamp mechanism coupled to said support bow for securing said protective cover assembly over the space, said clamp mechanism including:
a latch member for engaging the at least one wall,
a handle operatively engaging said latch member for moving said latch member between an engaged position and a disengaged position,
a link interconnecting said support bow and said rail, and
a collar coupled to said latch member and slidably coupled to said link when in both an operational and a stowed position for guiding said handle and said latch member between the operational position and the stowed position along said link,
wherein said link defines a first cross-sectional configuration along an operational portion of said link and said collar defines an inner surface having a shape complementary in configuration to said first cross-sectional configuration to prevent rotation of said collar relative to said link.

25. The cover assembly as set forth in claim 24 wherein said link includes a linking element for coupling said link to one of said first and second side rails wherein each of said first side rail and said second side rail defines a channel for accepting said linking element.

26. The cover assembly as set forth in claim 25 wherein said linking element includes an appendage and a fastener disposed through said appendage for securing said linking element within said channel.

27. The cover assembly as set forth in claim 24 further including a second clamp mechanism coupled to said support bow opposite said clamp mechanism for securing said protective cover assembly over the space.

28. The cover assembly as set forth in claim 24 wherein said link further defines a second cross-sectional configuration along said link for allowing said handle and said latch member to rotate about said link and into said stowed position.

29. The cover assembly as set forth in claim 24 wherein said clamp mechanism further includes a rod pivotally coupled to said collar and operatively engaging said latch member.

30. The cover assembly as set forth in claim 24 wherein said collar is configured to directly engage said link and be supported by said link for supporting said handle and said latch member relative to said link.

* * * * *